United States Patent [19]
Pollock et al.

[11] Patent Number: 4,900,654
[45] Date of Patent: Feb. 13, 1990

[54] PHOTOGRAPHIC ELEMENTS CONTAINING REFLECTIVE OR DIFFUSELY TRANSMISSIVE SUPPORTS

[75] Inventors: Mark A. Pollock, Johnson City; William J. Stowell; James J. Krutak, both of Kingsport, all of Tenn.

[73] Assignee: Eastman Kodak Company, Rochester, N.Y.

[21] Appl. No.: 243,523

[22] Filed: Sep. 9, 1988

Related U.S. Application Data

[63] Continuation-in-part of Ser. No. 47,821, May 5, 1987, Pat. No. 4,770,931.

[51] Int. Cl.$^4$ ................................................. G03C 1/78
[52] U.S. Cl. .................................. 430/533; 430/531; 430/950; 428/327
[58] Field of Search ....................... 430/533, 531, 950; 428/327, 317.9

[56] References Cited

U.S. PATENT DOCUMENTS

| | | | |
|---|---|---|---|
| 2,909,449 | 10/1959 | Banigan | 428/327 |
| 4,187,113 | 2/1980 | Mathews et al. | 430/533 |
| 4,427,775 | 1/1984 | Chen et al. | 435/161 |
| 4,603,073 | 7/1986 | Renalls et al. | 428/323 |

Primary Examiner—Paul R. Michl
Assistant Examiner—Thorl Chen
Attorney, Agent, or Firm—William J. Davis

[57] ABSTRACT

Disclosed are photographic elements having reflective or diffusely transmissive supports shaped from a continuous polyester phase having dispersed therein microbeads of cellulose acetate which are at least partially bordered by void space, the microbeads of cellulose acetate being poresent in an amount of about 10–30% by weight based on the weight of said polyester, said void space occupying about 2–50% by volume of said shaped article. Such articles have excellent physical properties.

8 Claims, 6 Drawing Sheets

PHOTOGRAPHIC ELEMENTS CONTAINING REFLECTIVE OR DIFFUSELY TRANSMISSIVE SUPPORTS

This is a continuation-in-part of U.S. Ser. No. 47,821, filed May 5, 1987 now U.S. Pat. No. 4,770,931, issued Sept. 13, 1988.

TECHNICAL FIELD

The present invention is directed to photographic elements having supports such as film supports having a polyester continuous phase containing cellulose ester microbeads dispersed therein which are at least partially bordered by voids. The supports have unique properties of texture, whiteness in the absence of colorants, diffuse transmission of light, and generally good physical properties such as tensile properties.

BACKGROUND OF THE INVENTION

Blends of linear polyesters with other incompatible materials of organic or inorganic nature to form microvoided structures are well-known in the art. U.S. Pat. No. 3,154,461 discloses, for example, the linear polyester, poly(ethylene terephthalate), blended with, for example, calcium carbonate. U.S. Pat. No. 3,944,699 discloses blends of linear polyester, preferably poly(ethylene terephthalate) with 3 to 27% of organic material such as ethylene or propylene polymer. U.S. Pat. No. 3,640,944 also discloses the use of poly(ethylene terephthalate) but blended with 8% organic material such as polysulfone or poly(4-methyl, 1-pentene). U.S. Pat. No. 4,377,616 discloses a blend of polypropylene to serve as the matrix with a small percentage of another and incompatible organic material, nylon, to initiate microvoiding in the polypropylene matrix. U.K. Patent Specification No. 1,563,591 discloses linear polyester polymers, and particularly poly(ethylene terephthalate), for making an opaque thermoplastic film support in which have been blended finely divided particles of barium sulfate together with a void-promoting polyolefin, such as polyethylene, polypropylene and poly-4-methyl-1-pentene.

The above-mentioned patents show that it is known to use incompatible blends to form films having paper-like characteristics after such blends have been extruded into films and the films have been quenched, biaxially oriented and heat set. The minor component of the blend, due to its incompatibility with the major component of the blend, upon melt extrusion into film forms generally spherical particles each of which initiates a microvoid in the resulting matrix formed by the major component. The melting points of the void initiating particles, in the use of organic materials, should be above the glass transition temperature of the major component of the blend and particularly at the temperature of biaxial orientation.

As indicated in U.S. Pat. No. 4,377,616, spherical particles initiate voids of unusual regularity and orientation in a stratified relationship throughout the matrix material after biaxial orientation of the extruded film. Each void tends to be of like shape, not necessarily of like size since the size depends upon the size of the particle.

Ideally, each void assumes a shape defined by two opposed and edge contacting concave disks. In other words, the voids tend to have a lens-like or biconvex shape. The voids are oriented so that the two major dimensions are aligned in correspondence with the direction of orientation of the film structure. One major dimension is aligned with machine direction orientation, a second major dimension is aligned with the transverse direction orientation, and a minor dimension approximately corresponds to the cross-section dimension of the void-initiating particle.

The voids generally tend to be closed cells, and thus there is virtually no path open from one side of a biaxially oriented film to the other side through which liquid or gas can traverse.

Upon biaxial orientation of the resulting extruded film, the film becomes white and opaque, the opacity resulting from light being scattered from the walls of the microvoids. The transmission of light through the film becomes lessened with increased number and with increased size of the microvoids relative to the size of a particle within each microvoid.

Also, upon biaxial orientation, a matte finish on the surface of the film results, as discussed in U.S. Pat. No. 3,154,461. The particles adjacent the surfaces of the film tend to be incompressible and thus form projections without rupturing the surface. Such matte finishes enable the film to be written upon with pencil or with inks, crayons, and the like.

Although the films discussed so far are generally white and opaque, suitable dyes may be used either in what will become the matrix polymer or in the void initiating particles. U.S. Pat. No. 4,377,616 points out that interesting effects can be achieved by the use of spheres of different colors or by the use of spheres of different color absorption or reflectance. The light scattered in a particular void may additionally either be absorbed or reflected by the void initiating sphere and a separate color contribution is made to the light scattering in each void.

U.S. Pat. No. 4,377,616 discloses that preferred particle size of a void initiating sphere may be about 0.1 to about 10 microns, and that preferred particle size range from about 0.75 to about 2 microns. U.S. Pat. No. 3,154,461 specifies that a range of sizes may be approximately 0.3 micron to approximately 20 microns, and that when calcium carbonate is used, its size may range from 1 to 5 microns.

U.S. Pat. No. 3,944,699, for example, indicates that the linear polyester component of the film may comprise any thermoplastic film forming polyester which may be produced by condensing one or more dicarboxylic acids or a lower alkyl diester thereof, such as terephthalic acid, isophthalic acid, 2,5-,2,6- or 2,7-naphthalene dicarboxylic acid, succinic acid, sebacic acid, adipic acid, azelaic acid, bibenzoic acid, and hexahydroterephthalic acid, or bis-p-carboxy phenoxy ethane, with one or more glycols. Such glycols may include ethylene glycol, 1,3-propanediol, 1,4-butanediol, neopentyl glycol, and 1,4-cyclohexanedimethanol. Also, a copolyester of any of the above-indicated materials may be used. The preferred polyester is poly(ethylene terephthalate).

U.S. Pat. No. 3,944,699 also indicates that the extrusion, quenching and stretching of the film may be effected by any process which is known in the art for producing oriented film, such as by a flat film process or a bubble or tubular process. The flat film process involves extruding the blend through a slit dye and rapidly quenching the extruded web upon a chilled casting drum so that the polyester component of the film is quenched into the amorphous state. The quenched film is then biaxially oriented by stretching in mutually perpendicular directions at a temperature above the glass transition temperature of the polyester. The film may be stretched in one direction and then in a second direction or may be simultaneously stretched in both directions. After the film has been stretched it is heat set by heating to a temperature sufficient to crystallize the polyester while restraining the film against retraction in both directions of stretching.

Paper is essentially a non-woven sheet of more or less randomly arrayed fibers. The key properties of these structures are opacity, texture, strength, and stability. Obviously, fiber technology evolved synergistically with paper, and today we have a variety of synthetic fibers and synthetic papers. In both areas, however, the synthetic materials have never quite matched the cellulose-based natural polymers, like cotton for fibers and cellulose pulps for papers. On the other hand, the natural polymers are generally weaker and less stable. A serious problem, for example, is brightness reversion or fading of papers and fibers. The present invention advances the state of these prior arts.

Although there are many ways to produce opaque media, this invention is concerned with creating opacity by stretching or orienting plastic materials to induce microvoids which scatter light, preferably white light. A large body of prior art deals with this technique, wherein a plurality of inorganic solid particles are used as the dispersed phase, around which the microvoids form. Some significant problems associated with this approach are: (1) agglomeration and particle size control, (2) abrasive wear of extrusion equipment, guides, and cutters, (3) high specific gravity of these solids, (4) poor void nucleation around the solid particles due to the low thermal contraction of solids relative to liquids and polymer wetting and adhesion to the solid surfaces, (5) cost of these materials on a volume basis, and (6) handling and processing problems in general. In every case, the invention reduces or eliminates the problem.

The prior art also teaches a variety of methods of creating surface texture. Often the surface is roughened by physical means like abrasion, crimping, etc. Many chemical methods are also used to react with, etch, or otherwise alter the surface. Flame, electrical corona, and electromagnetic radiations are often employed. Coating technology is well advanced for filling and whitening, and often inorganic materials are major components of these coatings. Even if the orientation or stretching step is eliminated, a coating step is required. Not only do most of the problems above remain, but new ones are created in such areas as adhesion, uniformity, and coating stability.

The cited prior art concentrates on synthetic paper compositions and methods of manufacturing directly related to this invention, namely compositions of matter involving polyesters and/or cellulose esters, stretching incompatible/immiscible thermoplastic blends to create voided structures with or without texture, and some of the properties and problems associated with the use of inorganic, nonmelting materials. The blend compositions and processing methods of this invention constitute a significant improvement over the immiscible polymer blend systems found in the prior art.

SUMMARY OF THE INVENTION

In one aspect, this invention is directed to a photographic element comprised of a reflective or diffusely transmissive support and, coated on the support, at least one radiation-sensitive silver halide emulsion layer. The photographic element is characterized in that the support is comprised of a continuous polyester phase having dispersed therein microbeads of cellulose acetate which are at least partially bordered by void space, the microbeads of cellulose acetate being present in an amount of 10–30% by weight based on the weight of the polyester, the void space occupying 2–50% by volume of the support.

DESCRIPTION OF THE DRAWINGS

The invention can be better appreciated by reference to the following detailed description considered in conjunction with the drawings, in which

FIGS. 9, 10, and 11 are photomicrographs of supports formed of a polyester continuous phase, cellulose ester microbeads forming a second phase, and microvoids bordering the microbeads.

DESCRIPTION OF PREFERRED EMBODIMENTS

Figure 1:
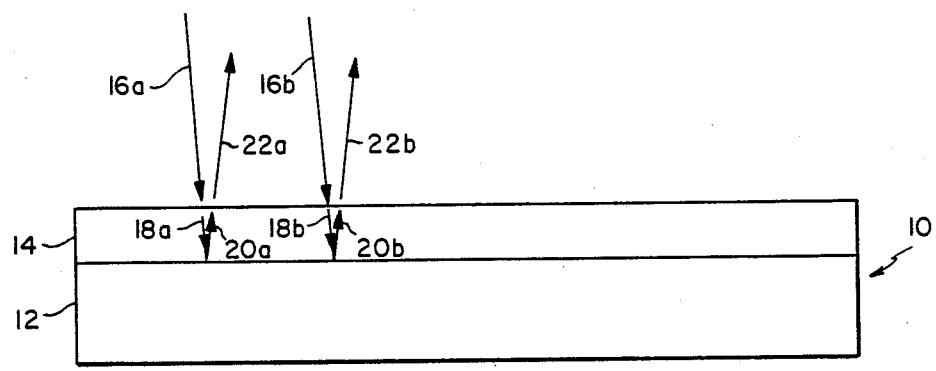
FIG. 1 is a schematic diagram of a photographic element according to the invention being imagewise exposed.

A photographic element 10 satisfying the requirements of the invention is shown in FIG. 1. The photographic element is comprised of a support 12 and an imaging unit 14 coated on the support. The imaging unit is comprised of at least one radiation-sensitive silver halide emulsion layer. In the simplest form of the invention the imaging unit consists of a single silver halide emulsion layer. Black-and-white photographic elements, for example, often contain a single silver halide emulsion layer. Alternatively, the imaging unit can be comprised of a plurality of silver halide emulsion layers. For example, color photographic elements typically contain blue, green, and red color forming layer units. Each of these color forming layer units contains at least one silver halide emulsion layer. In the most elaborate commonly employed form each color forming layer unit contains three separate silver halide emulsion layers of similar spectral sensitivity within a single color forming layer unit, but differing in speed.

As shown in FIG. 1 the photographic element is being imagewise exposed to radiation capable of producing a latent image in the silver halide emulsion layer or layers of the imaging unit. Exposing radiation, indicated by arrows 16a and 16b, strikes the imaging unit. Part of the incident radiation is absorbed in the imaging unit, with the remainder penetrating the imaging unit and striking the support, as indicated by arrows 18a and 18b.

Because of the highly reflective nature of the support chosen for the photographic element, a very high percentage of the exposing radiation striking the support is reflected, as indicated by arrows 20a and 20b. The reflected radiation traverses the imaging unit a second time, where, again, it is in part absorbed. The unabsorbed radiation is indicated by arrows 22a and 22b.

An important point to notice is that the reflective support allows exposing radiation to penetrate the imaging unit twice, almost doubling the opportunity for its absorption. This is in direct contrast to a photographic element having a transparent or absorptive support, which relies almost entirely on radiation producing a latent image in the imaging unit based on a single penetration of the imaging unit. Thus, with the same imaging unit a photographic element with a reflective support exhibits a higher photographic speed than a photographic element with a transmissive or absorptive support.

The photographic elements of this invention exhibit higher effective speeds than photographic elements with comparable imaging units and conventional reflective supports, since the reflective supports which satisfy the requirements of this invention reflect a larger percentage of exposing radiation that impinges upon them, particularly when the wavelength of the exposing radiation is in the blue (400 to 500 nm) and near ultraviolet (280 to 400 nm) range. Very large increases in reflection as compared to conventional titania loaded reflective photographic supports are observed at exposing wavelengths of 450 nm or less.

A portion of the exposing radiation incident on the support 12 is neither reflected nor absorbed, but is transmitted through the support. This portion of the radiation is not shown in FIG. 1, since it is possible to reduce transmitted radiation to a negligibly small portion of the total radiation while concurrently increasing reflected radiation by increasing the thickness of the support.

Figure 2:
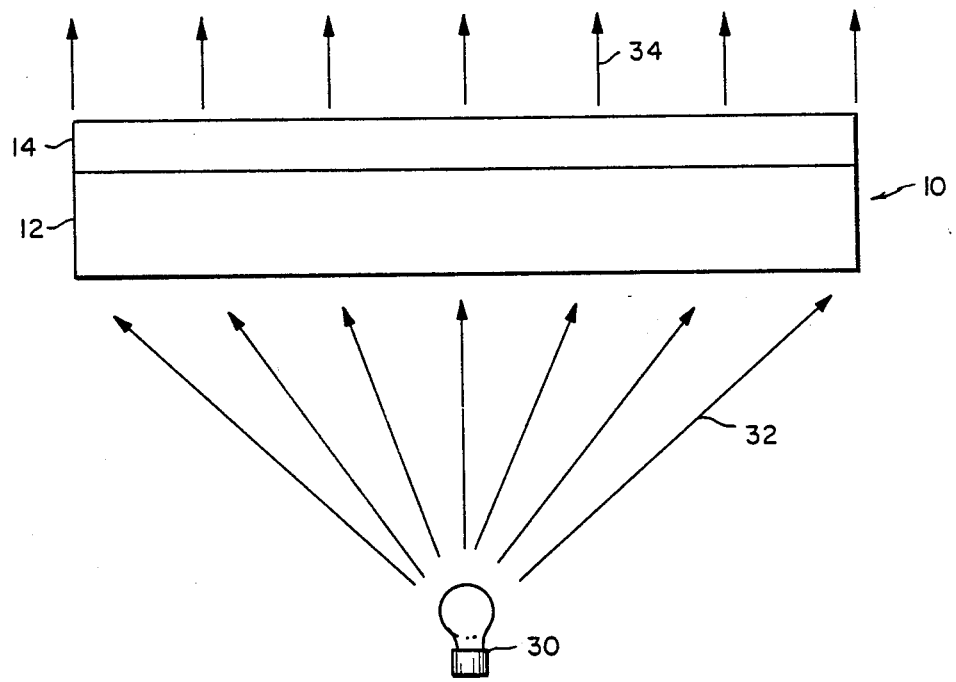
FIG. 2 is a schematic diagram of a photographic element according to the invention being back illuminated.

However, it is another significant advantage of the photographic elements of this invention that they can be constructed with supports that are diffusely transmissive. This is illustrated by reference to FIG. 2. In FIG. 2 the photographic element 10 is shown after it has been imagewise exposed and processed to produce an image. To view the image formed in the imaging unit 14 one of two different modes of viewing can be undertaken. The first of these is reflection viewing, in which ambient light penetrates the imaging unit and is reflected by the support back toward the viewer's eyes. The support reflects uniformly, with the perceived image being a function of the modulation of the ambient light that occurs during its initial and reflection passages through the imaging unit.

The second mode of viewing is transmission viewing. As shown in FIG. 2, an illumination source 30 directs light, indicated by arrows 32, to the support 12. While a portion of this light, not shown, is reflected by the support, a significant portion of the incident light enters the support and is diffusely transmitted. Diffuse transmission differs from specular transmission in that the light becomes scattered during the course of penetrating the support. Stated another way, even with the imaging unit exhibiting zero density or being entirely omitted, one viewing the support 12 from above (as shown) could not see the light source, but could see transmitted light, indicated by arrows 34, emanating from the support. With no image present in the imaging unit, the illuminated support appears uniformly white. When the imaging unit contains an image, this is superimposed on the illuminated white background provided by the support, and the image is readily viewed.

If the support were specularly transmissive (i.e., transparent), viewed from above (as shown), the viewer could see the illumination source as well as any image present in the imaging unit. This is visually objectionable, since the two images, the illumination source and the image in the imaging unit are superimposed. By providing a photographic element with a diffusely transmissive support a superior support for transmission viewing is provided.

A significant advantage of the photographic elements of this invention over those of the prior art is that a support construction is provided that is capable of use as either a reflective or diffuse transmission support.

STRETCH CAVITATION MICROVOIDED SUPPORTS

Figure 3:
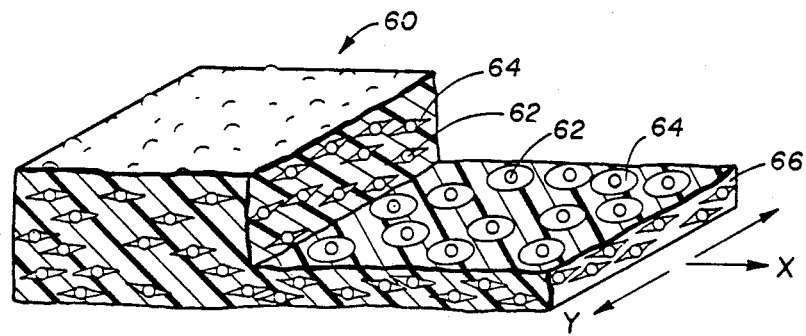
FIG. 3 is a perspective view in section illustrating a preferred embodiment of a support satisfying the requirements of the invention.

FIG. 3 illustrates a support 60 satisfying the requirements of this invention which has been biaxially oriented [biaxially stretched, i.e., stretched in both the longitudinal (X) and transverse (Y) directions], as indicated by the arrows. The support 60 is illustrated in section, showing microbeads 62 contained within circular microvoids 64 in the polymeric continuous matrix 66. The microvoids 64 surrounding the microbeads 62 are theoretically regular in shape, but on microscopic examination often show irregularities, particularly when the random spacing of the microbeads results in two or more microbeads being located in close proximity.

Figure 4:
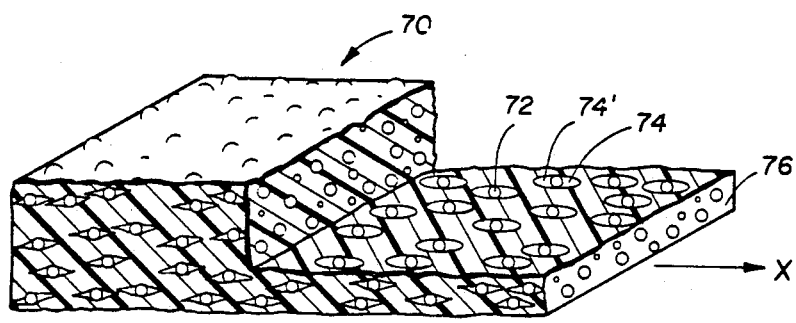
FIG. 4 is a perspective view in section illustrating an alternate construction of a support satisfying the requirements of the invention.

FIG. 4 also illustrates a support 70 which has been unidirectionally oriented (stretched in one direction only, as indicated by the arrow). Microbeads 72 are contained between microvoid lobes 74 and 74'. The microvoid lobes in this instance form at opposite sides of the microbeads as the sheet is stretched. Thus, if the stretching is done in only the longitudinal direction (X) as indicated by the arrow, the microvoids will form on the leading and trailing sides of the microbeads. This is because of the unidirectional orientation as opposed to the bidirectional orientation of the sheet shown in FIG. 4. This is the only difference between the supports of FIGS. 3 and 4.

Attention is particularly directed to the texture of the upper surfaces of the supports in each of FIGS. 3 and 4.

Figure 6:
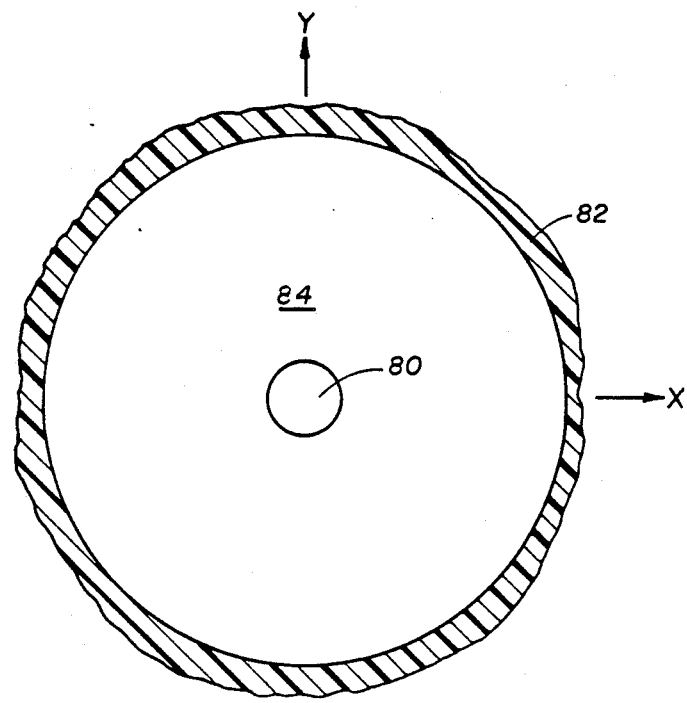
FIG. 6 is a sectional view taken along section line 6—6 in FIG. 5.
Figure 5:
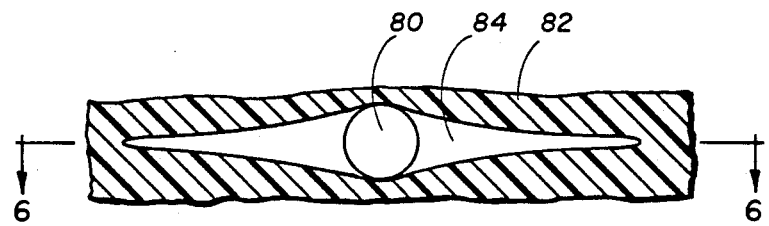
FIGS. 5 and 7 are enlarged sectional views illustrating a microbead of cellulose acetate entrapped in a void in a polyester continuous phase.

FIGS. 5 and 6 are sectional views which illustrate on an enlarged scale a microbead 80 being entrapped within the polymeric continuous matrix 82 and encircled by microvoid 84. This lshape results from the support being stretched in both the X and Y directions.

Figure 7:
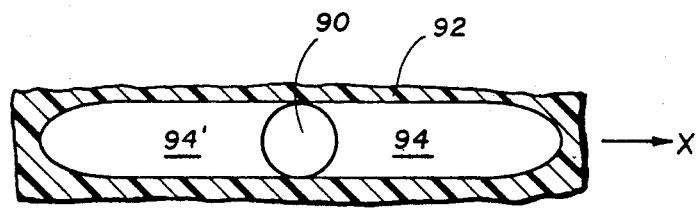

FIG. 7 is a view similar to FIG. 5, except illustrating in enlarged form microbead 90 entrapped in the polymeric continuous matrix 92, having formed on opposite sides thereof microvoid lobes 94 and 94', which are formed when the support is stretched only in the direction of the arrow X.

Figure 8:
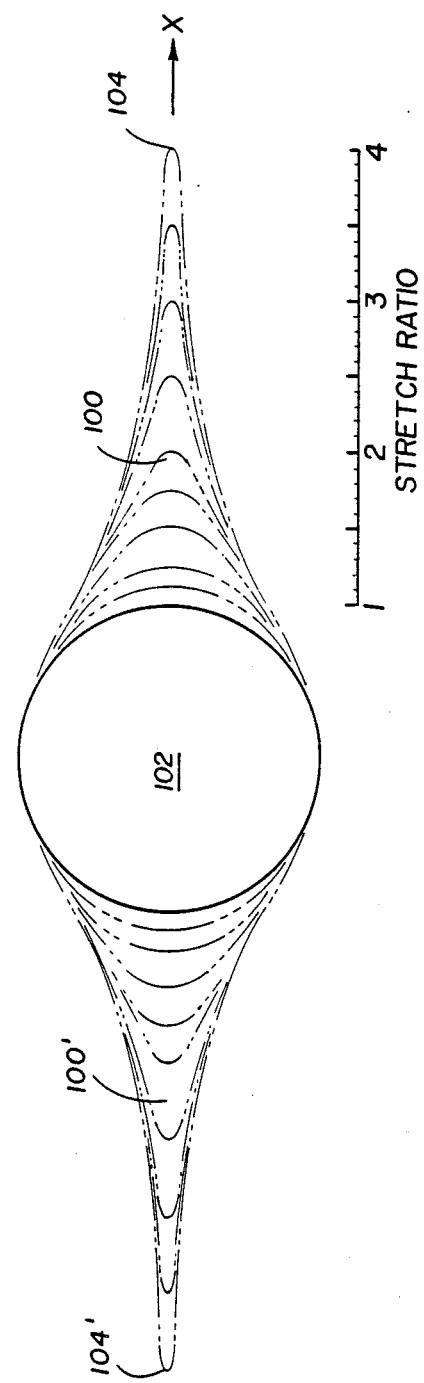
FIG. 8 is a graphical view illustrating the change in size of microvoids surrounding microbeads as a function of the stretch ratio.

FIG. 8 is an enlargement illustrating a specific manner in which microvoids can be formed in a polyester continuous matrix as the support is stretched or oriented. The formation of the microvoids 100 and 100' around microbeads 102 is illustrated on a stretch ratio scale as the support is stretched up to 4 times its original dimension. For example, as the support is stretched 4 times its original dimension in the X direction (4X), the microvoids extend to the points 104 and 104', respectively.

FIGS. 9 and 10 are actual photomicrographs of sections of a support according to this invention which has been frozen and fractured. The continuous polymeric matrix, microbeads, and microvoids are obvious. FIG. 11 is an actual photomicrograph of a section of support oriented in one direction. The scale of these photomicrographs is indicated at the top of each in micrometers ($\mu$m).

In this preferred form of the invention the supports are comprised of a continuous thermoplastic polyester phase having dispersed therein microbeads of cellulose ester which are at least partially bordered by voids. The supports are conveniently in the form of sheets or film. The polyester is relatively strong and tough, while the cellulose acetate is relatively hard and brittle.

More specifically, the present invention provides supports comprising a continuous thermoplastic polyester phase having dispersed therein microbeads of cellulose ester which are at least partially bordered by voids, the microbeads of cellulose acetate being present in an amount of 10–30% by weight based on the weight of polyester, the voids occupying 2–50% by volume of the shaped article, the composition of the shaped article when consisting only of the polyester continuous phase and microbeads of cellulose ester bordered by voids characterized by having a Kubelka-Munk R value (infinite thickness) of 0.90 to 1.0 and the following Kubelka-Munk values when formed into a 3 mil (76.2 microns) thick film:

| | |
|---|---|
| Opacity | about 0.78 to about 1.0 |
| SX | 25 or less |
| KX | about 0.001 to 0.2 |
| Ti | about 0.02 to 1.0 | wherein the opacity values indicate that the article is opaque, the SX values indicate a large amount of light scattering through the thickness of the article, the KX values indicate a low amount of light absorption through the thickness of the article, and the Ti values indicate a low level amount of internal transmittance of the thickness of the article. The R (infinite thickness) values indicate a large amount of light reflectance.

Obviously, the Kubelka-Munk values which are dependent on thickness of the article must be specified at a certain thickness. Although the supports themselves may be very thin, e.g., less than 1 mil (25.4 micron) or they may be thicker, e.g., 20 mils (508 microns), the Kubelka-Munk values, except for R($\infty$), are specified at 3 mils (76.2 microns) and in the absence of any additives which would effect optical properties. Thus, to determine whether supports have the optical properties called for, the polyester containing microbeads at least partially bordered by voids, without additives, should be formed in a 3 mils (approx. 75 $\mu$m) thick film for determination of Kubelka-Munk values.

The supports according to this invention are useful, for example, when in the forms of sheets or films. In the absence of additives or colorants, they are very white. The supports are very resistant to wear, moisture, oil, tearing, etc.

The polyester (or copolyester) phase may be any article-forming polyester such as a polyester capable of being cast into a film or sheet, spun into fibers, extruded into rods or extrusion, blow-molded into containers such as bottles, etc. The polyesters should have a glass transition temperature between 50° C. and 150° C., preferably 60°–100° C., should be orientable, and have an I.V. of at least 0.55, preferably 0.6 to 0.9. Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, and mixtures thereof. Examples of suitable glycols include ethylene glycol, propylene glycol, butanediol, pentanediol, hexanediol, 1,4-cyclohexanedimethanol, diethylene glycol, and mixtures thereof. Such polyesters are well known in the art and may be produced by well-known techniques, e.g., those described in U.S. Pat. Nos. 2,465,319 and 2,901,466. The preferred polyester is polyethylene terephthalate having a Tg of about 80° C. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607, 4,459,402 and 4,468,510.

Blends of polyesters and/or copolyesters are useful in the present invention. Also, small amounts of other polymers such as polyolefins can be tolerated in the continuous matrix.

Suitable cellulose acetates are those having an acetyl content of 28 to 44.8% by weight, and a viscosity of 0.01–90 seconds. Such cellulose acetates are well known in the art. Small contents of propionyl can usually be tolerated. Also, processes for preparing such cellulose acetates are well known in the art. Suitable commercially available cellulose acetates include the following which are marketed by Eastman Chemical Products, Inc.:

| Cellulose Acetate Type | Viscosity[1] Seconds | Viscosity[1] Poises (Pascal-Sec.) | Acetyl Content %[2] | Hydroxyl Content %[2] | Melting Range °C. | Tg, °C. | Number Average Molecular Weight[3] |
|---|---|---|---|---|---|---|---|
| CA-394-60S | 60.0 | 22.8 | 39.5 | 4.0 | 240–260 | 186 | 60,000 |
| CA-398-3 | 3.0 | 1.14 | 39.8 | 3.5 | 230–250 | 180 | 30,000 |
| CA-398-6 | 6.0 | 2.28 | 39.8 | 3.5 | 230–250 | 182 | 35,000 |
| CA-398-10 | 10.0 | 3.80 | 39.8 | 3.5 | 230–250 | 185 | 40,000 |
| CA-398-30 | 30.0 | 11.40 | 39.7 | 3.5 | 230–250 | 189 | 50,000 |
| CA-320S | 0.05 | 0.02 | 32.0 | 8.4 | 190–269 | about 180–190 | about 18,000 |
| CA-436-80S | 80 | 30.4 | 43.7 | 0.82 | 269–300 | 180 | 102,000 |

[1]ASTM D817 (Formula A) and D1343
[2]ASTM D817
[3]Molecular weights are polystyrene equivalent molecular weights, using Gel Permeation Chromatography The microbeads of cellulose esters range in size from 0.1–50 microns, and are present in an amount of 10–30% by weight based on the weight of the polyester. The microbeads of cellulose acetate have a Tg of at least 20° C. higher than the Tg of the polyester and are hard compared to the polyester.

The microbeads of cellulose acetate are at least partially bordered by voids. The void space in the shaped article should occupy 2–50%, preferably 20–30%, by volume of the shaped article. Depending on the manner in which the supports are made, the voids may completely encircle the microbeads, e.g., a void may be in the shape of a doughnut (or flattened doughnut) encircling a microbead, or the voids may only partially border the microbeads, e.g., a pair of voids may border a microbead on opposite sides.

The invention does not require but permits the use or addition of a plurality of organic and inorganic materials such as fillers, pigments, anti-blocks, anti-stats, plasticizers, dyes, stabilizers, nucleating agents, etc. These materials may be incorporated into the matrix phases, into the dispersed phases, or may exist as separate dispersed phases.

The microvoids form on cooling without requiring nucleating agents. During stretching the voids assume characteristic shapes from the balanced biaxial orientation of paperlike films to the uniaxial orientation of microvoided/satin-like fibers. Balanced microvoids are largely circular in the plane of orientation while fiber microvoids are elongated in the direction of the fiber axis. The size of the microvoids and the ultimate physical properties depend upon the degree and balance of the orientation, temperature and rate of stretching, crystallization kinetics, the size distribution of the microbeads, and the like.

The supports according to this invention are prepared by (a) forming a mixture of molten polyester and cellulose acetate wherein the cellulose acetate is a multiplicity of microbeads uniformly dispersed throughout the polyester, the polyester being as described hereinbefore, the cellulose acetate being as described hereinbefore, (b) forming a shaped article from the mixture by extrusion, casting or molding, (c) orienting the article by stretching to form microbeads of cellulose acetate uniformly distributed throughout the article and voids at least partially bordering the microbeads on sides thereof in the direction, or directions of orientation.

The mixture may be formed by forming a melt of the polyester and mixing therein the cellulose acetate. The cellulose acetate may be in the form of solid or semisolid microbeads, or in molten form. Due to the incompatability between the polyester and cellulose acetate, there is no attraction or adhesion between them, allowing the cellulose acetate to "bead-up" if molten to form dispersed microbeads upon mixing. If solid or semisolid, the microbeads become uniformly dispersed in the polyester upon mixing.

When the microbeads have become uniformly dispersed in the polyester, a shaped article is formed by processes such as extrusion, casting or molding. Examples of extrusion or casting would be extruding or casting a film or sheet. Such forming methods are well known in the art. If sheets or film material are cast or extruded, it is important that such article be oriented by stretching, at least in one direction. Methods of unilaterally or bilaterally orienting sheet or film material are well known in the art. Basically, such methods comprise stretching the sheet or film at least in the machine or longitudinal direction after it is cast or extruded by an amount of about 1.5–10 (usually 3–4) times its original dimension. Such sheet or film may also be stretched in the transverse or cross-machine direction by apparatus and methods well known in the art, in amounts of generally 1.5–10 (usually 3–4) times the original dimension. Such apparatus and methods are well known in the art—e.g., they are described in such U.S. Pat. Nos. 3,903,234, incorporated herein by reference.

The voids, or void spaces, referred to herein surrounding the microbeads are formed as the polyester continuous matrix is stretched at a temperature between the polyester Tg and the cellulose acetate Tg. The microbeads of cellulose acetate are relatively hard compared to the polyester continuous matrix. Also, due to the incompatability and immiscibility between the cellulose acetate and the polyester, the polyester continuous matrix slides over the microbeads as it is stretched, causing voids to be formed at the sides in the direction or directions of stretch, which voids elongate as the polyester matrix continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix material. When stretching is done in the neighborhood of the higher glass transition temperature, both phases stretch together and opacity decreases. In the former case, the materials are pulled apart, a mechanical anti-compatibilization process. In the latter case, they are drawn together, a mechanical compatibilization process. Two examples are high-speed melt spinning of fibers and melt blowing of fibers and films to form non-woven/spun-bonded products. In summary, the scope of this invention includes the complete range of forming operations just described.

In general, void formation occurs independent of, and does not require, crystalline orientation of the matrix phase. Opaque, microvoided films have been made in accordance with the methods of this invention using completely amorphous, non-crystallizing copolyesters as the matrix phase. Crystallizable/orientable (strain hardening) matrix materials are preferred for some properties like tensile strength and barrier effectiveness. On the other hand, amorphous matrix materials have special utility in other areas like tear resistance and heat sealability. The specific matrix composition can be tailored to meet many product needs. The complete range from crystalline to amorphous matrix materials is part of the invention.

Stretching experiments reveal that increasing the cellulose ester content of the blends reduces the effective natural draw ratio relative to that of the matrix material and raises the effective orientation or draw temperature. When melt casting these films, required casting roll temperature increases with cellulose ester content. Minimal cooling below the orientation temperature prior to stretching is preferred since the cooled preform state is often brittle, the brittleness increasing with cellulose ester content.

The following examples are submitted for a better understanding of the invention.

In the examples the specified materials were combined and mixed in a dry state prior to extrusion. Most of the materials used in these examples are granules (ground through a 2 millimeter screen) and fine powders. This form permits good dry blending without separation during processing. In most cases, the mixed materials were dried under vacuum conditions with nitrogen bleed to carry off the volatiles. Of course, when substantial amounts of low-melting materials were used, separate drying was done, followed by mixing and immediate extrusion. The relative amounts of the polyester, cellulose ester, and other materials are indicated by mass ratios; and all percents are weight %. During extrusion, the materials are melted and mixed as viscous melts. Shear emulsification of the immiscible melts was enhanced with a mixing section centrally located in the metering section of the extruder screw. Residence time was kept small by design; for example, screw L/D was 24:1 [Killion 1.25 inch (31.8 mm) extruder] and the dies were joined directly to the extruder via small-sized adaptors. The extrudate is quenched to form flat films or sheet. The required orientation was carried out by conventional equipment and methods associated with the specific forming operation.

EXAMPLES OF STRETCH CAVITATION MICROVOIDED SUPPORTS

The following are specific examples illustrating the preparation of stretch cavitation microvoided articles suitable for use as supports for the photographic elements of this invention.

EXAMPLE 1

Blends were prepared with a polyester and a cellulose acetate. The polyester is Polyester A (described below) and the cellulose ester is cellulose acetate CA-398-30. Two blends (80/20) and (90/10) were melt cast to form sheets between 15 to 20 mils (381 to 508 microns) thick. These sheets were simultaneously stretched 4X (a multiple of 4) in both directions to form white, paper-like films just over 1 mil (25.4 microns) thick. The films of this invention are highly diffuse reflective over the visible spectrum and remain highly reflective in the near UV (300 to 400 nanometer wavelengths) region. Typical films properties and processing conditions are given below.

EXAMPLE 2 (CONTROL)

This example is an example of prior art. It is given here for direct comparison with Example 1. Blends were prepared with the same polyester as Example 1 and inorganic materials. The inorganics are titanium dioxide (Rutile R-100) and calcium carbonate (Microwhite 25). A (90/10) blend of the polyester and each of the inorganics was melt cast to form sheets between 15 to 20 mils (381 to 508 microns) thick. These sheets were simultaneously stretched 4X in both directions to form white, plastic-like films just over 1 mil (25.4 microns) thick. Typical film properties and processing conditions are given below.

EXAMPLE 3

Blends were prepared with a polyester and a cellulose acetate. The polyester is a blend of Polyester A and Polyester A containing a covalently bound colorant. The cellulose acetate is CA-398-30. Two (80/20) blends (one containing 0.5% red moiety and one containing 0.5% blue moiety) were melt cast to form sheets 20 mils (508 microns) thick. These sheets were simultaneously stretched 4X in both directions to form pastel-colored, paper-like films about 1.75 mils (44.5 microns) thick. Typical film properties and processing conditions are given below.

EXAMPLE 4

Blends were prepared with a polyester and a mixed cellulose ester, cellulose acetate propionate. The polyester is Polyester A and the cellulose ester is CAP-482-20. This (90/10) blend and a (90/10) blend made like Example 1 were melt cast to form sheets 15 mils (381 microns) thick. These sheets were simultaneously stretched 4X in both directions to form translucent, paper-like films about 1 mil (25.4 microns) thick. Typical film properties and processing conditions are given below.

EXAMPLE 5

Blends were prepared with the same polyester and cellulose acetate as Example 1. The specific blends (95/5), (90/10), (85/15), (80/20), (75/25), and (70/30) were melt cast to form sheets 25 mils (635 microns) thick. Extrusion conditions were similar to those of Example 1. These sheets were simultaneously stretched 3X in both directions to form white, paper-like films 3 mils (76.2 microns) thick. These sheets were also simultaneously stretched 4X in both directions to form white, paper-like films 2 mils (50.8 microns) thick. Typical film optical properties are given below.

EXAMPLE 6

This example shows that light-colored, opaque structures developed when the dispersed phase was colored. The polyester of Example 1 was mixed with a cellulose acetate (CA-320S, containing a covalently bonded colorant). A (90/10) blend (containing 0.13% red moiety) was melt cast to form sheets 15 mils (381 microns) thick. These sheets were stretched as in Example 1 yielding uniformly pastel-red, opaque, paper-like films.

EXAMPLE 7

This example shows that lower viscosity polyesters containing minor amounts of additives yielded products of this invention. A blend was prepared with a polyester and a cellulose acetate. The polyester is Polyester B (described below) and the cellulose acetate is CA-398-30. A (90/10) blend was melt cast to form sheets between 15 to 20 mils (381 to 508 microns) thick. A Brabender ¾-inch (19-mm) laboratory extruder without a mixing screw was used at 110 RPM and 260° C. (melt temperature). These sheets were simultaneously stretched 4X in both directions to form white, paper-like films just over 1 mil (25.4 microns) thick. These films contained visible particles of cellulose acetate resulting from the incomplete shear emulsification on this machine.

EXAMPLE 8

This example shows that white, opaque properties developed over a range of stretching conditions. A (90/10) blend of the same materials as Example 1 was melt cast using the equipment of Example 6. Stretching conditions were (2×1), (2×2), (3×1), (3×2), (3×3), (4×1), (4×2), (4×3) and (4×4). Whiteness and opacity were visually evident at all levels of stretching, increasing with balance and degree of stretch.

EXAMPLE 9

This example illustrates that polyester/polyester blends can be used with cellulose acetates to produce articles of this invention. The specific blends of this example are (65/25/10) and (65/15/20) using Polyester A, Polyester C, and CA-398-30 respectively. Films were made as in Example 1, and the resulting properties were similar. The films of this example, however, were more flexible due to the presence of the thermoplastic elastomer in the blend.

EXAMPLE 10

Blends were prepared with a polyester and a cellulose acetate. The polyester is Polyester A and the cellulose acetate is CA-394-60S. The following blends (95/5), (90/10), (85/15), and (80/20) were melt extruded and simultaneously biaxially oriented on a laboratory blown film line. The oriented tubes had a layflat width of 9 to 12 inches (22.9 to 30.5 centimeters), and the film thickness was about 0.5 mil (12.7 microns). These films were white, opaque, and had tissue paper qualities. Typical film properties and processing conditions are given below.

EXAMPLE 11

Blends were prepared with a polyester and a cellulose acetate. The polyester is a blend of Polyester A and Polyester A containing a covalently bound colorant. The cellulose acetate is CA-398-30. Four (80/20) blends were melt extruded and simultaneously biaxially oriented as in Example 10. Typical film properties and processing conditions are given below.

EXAMPLE 12

A (90/10) blend was prepared with a higher glass transition polyester, Polyester D, and a cellulose acetate (CA-394-60S). This blend was melt extruded at a melt temperature of 270° C. and simultaneously biaxially oriented at about 140° C. as in Example 10. The resulting film was white, opaque, and paper-like. This blend system is especially attractive if high temperature resistant products are being manufactured.

EXAMPLE 13

The blends of this example were prepared from a polyester, a polypropylene, and a cellulose acetate. The polyester is Polyester A; the polypropylene homopolymer is PP 4230; and the cellulose acetate is CA-394-60S. Three blends (70/10/20), (75/5/20), and (77/3/20) were melt extruded and simultaneously biaxially oriented as in Example 10. White, opaque, paper-like films were made, however film strength and quality decreased as the level of polypropylene increased.

EXAMPLE 14

A (90/10) blend was prepared with a polyester, Polyester A, and a cellulose triacetate CA-436-80S. This blend was melt extruded at a melt temperature of 275° C. and simultaneously biaxially oriented as in Example 10. White, opaque, paper-like films were made, however the quality of the film was degraded by the presence of small particles of incompletely melted cellulose triacetate.

EXAMPLE 15

Blends were prepared with a polyester, Polyester A, a water-dispersible polyester, and a cellulose acetate (CA-398-30). The blend was melt extruded and simultaneously biaxially oriented as in Example 10. The white, opaque, paper-like films were of good quality, with an enhanced hydrophilic character due to the presence of the hydrophilic polyester.

EXAMPLE 16

A (90/10) blend of an amorphous copolyester and a cellulose acetate was prepared. The copolyester was Polyester E, and the cellulose acetate was CA-394-60S. The blend was melt extruded and simultaneously biaxially oriented as in Example 10; however the white, opaque, paper-like films had a faint, yellowish tint, indicating greater thermal degradation.

EXAMPLE 17

A (90/10) blend of another copolyester and a cellulose acetate was prepared. The copolyester was Polyester F and the cellulose acetate was CA-398-30. The blend was melt extruded and simultaneously biaxially oriented as in Example 10. A good quality, white, opaque, paper-like film resulted.

EXAMPLE 18

A (90/10) blend was prepared from a polyester, Polyester A, and a lower viscosity cellulose acetate (CA-398-3). A second (90/10) blend of this polyester with a lower percent acetyl cellulose acetate (CA-320S) was also prepared. Both blends were melt extruded and simultaneously biaxially oriented as in Example 10. Good quality, white, opaque, paper-like films resulted.

| EXAMPLE 1 TYPICAL CAST & TENTERED FILM PROPERTIES FOR 80/20 & 90/10 POLYESTER/CELLULOSE ACETATE | | |
|---|---|---|
| Material | (80) Polyester A (20) CA-398-30 | (90) Polyester A (10) CA-398-30 |
| Melt Temp., °C. | 260 | 262 |
| Screw Speed (rpm) | 50 | 50 |
| Cast Roll Temp., °C. | 82 | 58 |
| Cast Roll Speed (fpm) | 6.0 (1.83 meters/min) | — |
| Stretch Temp., °C. | 120 | 110 |
| Film Thickness (mil) | 1.37 (34.8 microns) | 1.17 (29.7 microns) |
| Inherent Visc. (dl/g) | 0.590 | 0.623 |
| Density (g/cc) | 1.023 | 1.303 |
| Tensile Yield ($10^3$ psi)(mPa)* | 7.40/6.67 (51.0/46.0) | 12.8/12.6 (88.3/86.9) |
| Tensile Break ($10^3$ psi) | 10.4/8.74 (71.7/60.3) | 23.5/22.4 (162/154) |
| Elongation to Break (%) | 70/61 | 92/77 |
| Oxygen Transmission (cc-mil/100 in$^2$ 24-hr-atm) (liter)(micron) ($m^2$)(24 hr)(atm) | 16.0(6.30) | 9.54(3.76) |
| Kubelka-Munk Analysis (560 nm): | | |
| Scattering SX | 3.644 | 2.308 |
| Absorption KX | 0.002x | 0.002x |

EXAMPLE 1
TYPICAL CAST & TENTERED FILM PROPERTIES FOR 80/20 & 90/10 POLYESTER/CELLULOSE ACETATE
-continued

| | | |
|---|---|---|
| Transmittance T(i) | 0.214 | 0.302 |
| Reflectance R(inf) | 0.966 | 0.966 |
| Opacity | 0.812 | 0.722 |

*megaPascals

EXAMPLE 2
CAST & TENTERED FILM PROPERTIES FOR 90/10 POLYESTER/INORGANIC FILLER

| Material | (90) Polyester A (10) Rutile R-100 | (90) Polyester A (10) Microwhite 25 |
|---|---|---|
| Melt Temp., °C. | 263 | 263 |
| Screw Speed (rpm) | 50 | 50 |
| Cast Roll Temp., °C. | 42 | 50 |
| Cast Roll Speed (fpm) | — meter/min | — |
| Stretch Temp., °C. | 110 | 110 |
| Film Thickness (mil) | 1.13 (28.7 microns) | 1.33 (33.8 microns) |
| Inherent Visc. (dl/g) | 0.563 | 0.573 |
| Density (g/cc) | 1.432 | 1.323 |
| Tensile Yield ($10^3$ psi)(mPa)* | 11.3/12.0 (77.9/82.7) | 10.8/11.2 (74.5/77.2) |
| Tensile Break ($10^3$ psi) | 18.6/20.3 (128/140) | 16.5/17.7 (114/122) |
| Elongation to Break (%) | 103/100 | 73/71 |
| Oxygen Transmission (cc-mil/100 in$^2$ 24-hr-atm) (liter)(micron)/(m$^2$)(24 hr)(atm) | 8.72 (3.43) | 10.2 (4.02) |
| Kubelka-Munk Analysis (560 nm): | | |
| Scattering SX | 2.310 | 1.115 |
| Absorption KX | 0.005x | 0.008x |
| Transmittance T(i) | 0.300 | 0.468 |
| Reflectance R(inf) | 0.936 | 0.886 |
| Opacity | 0.742 | 0.591 |

*megaPascals

EXAMPLE 3
FOR 75/5/20 POLYESTER/RED POLYESTER/CELLULOSE ACETATE 75/5/20 POLYESTER/BLUE POLYESTER/CELLULOSE ACETATE

| Material | (75) Polyester A (5) Polyester A (Red) (20) CA-398-30 | (75) Polyester A (5) Polyester A (Blue) (20) CA-398-30 |
|---|---|---|
| Melt Temp., °C. | 260 | 260 |
| Screw Speed (rpm) | 50 | 50 |
| Cast Roll Temp., °C. | 82 | 82 |
| Cast Roll Speed (fpm) | 6.0 (1.83 meters/min) | 6.0 (1.83 meters/min) |
| Stretch Temp., °C. | 120 | 125 |
| Film Thickness (mil) | 1.78 (45.2 microns) | 1.75 (44.4 microns) |
| Inherent Visc. (dl/g) | 0.640 | 0.672 |
| Density (g/cc) | 0.889 | 0.895 |
| Tensile Yield ($10^3$ psi)(mPa)* | 6.19/6.00 (42.7/41.4) | 4.97/4.92 (34.3/33.9) |
| Tensile Break ($10^3$ psi) | 8.10/7.75 (55.8/53.4) | 5.78/5.38 (39.9/37.1) |
| Elongation to Break (%) | 50/42 | 41/23 |
| Oxygen Transmission (cc-mil/100 in$^2$ 24-hr-atm) (liter)(micron)/(m$^2$)(24 hr)(atm) | 18.4 (7.24) | 21.8 (8.58) |
| Kubelka-Munk Analysis (560 nm): | | |
| Scattering SX | 5.571 | 6.530 |
| Absorption KX | 2.332x | 2.408x |
| Transmittance T(i) | 0.003 | 0.000 |
| Reflectance R(inf) | 0.413 | 0.434 |
| Opacity | 1.000 | 1.000 |

*megaPascals

EXAMPLE 4
CAST & TENTERED FILM PROPERTIES FOR 90/10 POLYESTER/CELLULOSE ACETATE AND 90/10 POLYESTER/CELLULOSE ACETATE PROPIONATE

| Material | (90) Polyester A (10) CA-398-30 | (90) Polyester A (10) CAP-482-20 |
|---|---|---|
| Melt Temp., °C. | 264 | 264 |
| Screw Speed (rpm) | 50 | 50 |
| Cast Roll Temp., °C. | 49 | 49 |
| Cast Roll Speed (fpm) | 6.0 (1.83 meters/min) | 6.0 (1.83 meters/min) |
| Stretch Temp., °C. | 105 | 115 |
| Film Thickness (mil) | 1.03 (26.2 microns) | 0.94 (23.9 microns) |
| Inherent Visc. (dl/g) | 0.603 | 0.665 |
| Density (g/cc) | 1.192 | 1.364 |
| Tensile Yield ($10^3$ psi)(mPA)* | 13.5/13.7 (93.1/94.5) | 15.9/15.1 (111/104) |
| Tensile Break ($10^3$ psi) | 25.5/25.9 (176/179) | 29.0/29.2 (200/201) |
| Elongation to Break (%) | 84/78 | 103/108 |
| Oxygen Transmission (cc-mil/100 in$^2$ 24-hr-atm) (liter)(micron)/(m$^2$)(24 hr)(atm) | 8.01 (3.15) | 7.34 (2.89) |
| Kubelka-Munk Analysis (560 nm): | | |
| Scattering SX | 2.397 | 0.398 |
| Absorption KX | 0.006x | 0.006x |
| Transmittance T(i) | 0.292 | 0.711 |
| Reflectance R(inf) | 0.930 | 0.848 |
| Opacity | 0.756 | 0.334 |

*megaPascals

EXAMPLE 5
KUBELKA-MUNK ANALYSES

| Polyester/ Cellulose Acetate (Mass Ratio) | Stretch Ratios (X x Y) | Stretch Temp., °C. | Reheat Time (Sec) | Thickness (Mils) | Thickness (Microns) | Kubelka-Munk Values SX | KX | T(i) | R∞ | Opacity |
|---|---|---|---|---|---|---|---|---|---|---|
| 99/1 | 3 × 3 | 100 | 45 | 2.7 | 68.6 | 0.201 | 0.012X | 0.822 | 0.710 | 0.233 |
| 98/2 | 3 × 3 | 100 | 45 | 2.8 | 71.1 | 0.272 | 0.014X | 0.775 | 0.730 | 0.289 |
| 95/5 | 3 × 3 | 100 | 60 | 2.9 | 73.7 | 0.861 | 0.013X | 0.529 | 0.838 | 0.545 |
| 90/10 | 3 × 3 | 100 | 75 | 3.2 | 81.3 | 2.611 | 0.014X | 0.271 | 0.901 | 0.794 |
| 85/15 | 3 × 3 | 100 | 75 | 3.7 | 94.0 | 6.484 | 0.015X | 0.128 | 0.933 | 0.917 |
| 80/20 | 3 × 3 | 100 | 75 | 4.0 | 102 | 11.892 | 0.013X | 0.073 | 0.954 | 0.958 |

-continued

EXAMPLE 5
KUBELKA-MUNK ANALYSES

| Polyester/Cellulose Acetate (Mass Ratio) | Stretch Ratios (X x Y) | Stretch Temp., °C. | Reheat Time (Sec) | Thickness (Mils) | Thickness (Microns) | SX | KX | T(i) | R∞ | Opacity |
|---|---|---|---|---|---|---|---|---|---|---|
| 75/25 | 3 × 3 | 100 | 60 | 3.4 | 86.4 | 12.126 | 0.016X | 0.071 | 0.950 | 0.961 |
| 70/30 | 3 × 3 | 110 | 75 | 5.2 | 132 | 19.160 | 0.015X | 0.045 | 0.961 | 0.978 |
| 75/25 | 3.5 × 3.5 | 115 | 60 | 2.7 | 68.6 | 7.262 | 0.012X | 0.117 | 0.945 | 0.922 |
| 70/30 | 3.5 × 3.5 | 115 | 60 | 5.0 | 127 | 21.990 | 0.012X | 0.040 | 0.967 | 0.980 |
| 99/1 | 4 × 4 | 110 | 60 | 1.6 | 40.6 | 0.195 | 0.011X | 0.828 | 0.719 | 0.224 |
| 98/2 | 4 × 4 | 110 | 60 | 1.6 | 40.6 | 0.260 | 0.011X | 0.785 | 0.749 | 0.273 |
| 95/5 | 4 × 4 | 110 | 60 | 1.8 | 45.7 | 0.745 | 0.010X | 0.567 | 0.851 | 0.497 |
| 90/10 | 4 × 4 | 110 | 60 | 2.1 | 53.3 | 2.583 | 0.010X | 0.274 | 0.914 | 0.782 |
| 85/15 | 4 × 4 | 115 | 60 | 2.0 | 50.8 | 4.076 | 0.009X | 0.193 | 0.937 | 0.851 |
| 80/20 | 4 × 4 | 115 | 45 | 2.7 | 68.6 | 9.699 | 0.011X | 0.090 | 0.954 | 0.943 |
| 70/30 | 4 × 4 | 120 | 120 | 5.8 | 147 | 22.634 | 0.015X | 0.037 | 0.964 | 0.983 |

EXAMPLE 10
BLOWN FILM PROPERTIES

| Material of Blend | (95) Polyester A (5) CA-394-60S | (90) Polyester A (10) CA-394-60S | (85) Polyester A (15) CA-394-60S | (80) Polyester A (20) CA-394-60S |
|---|---|---|---|---|
| Extruder Melt Temp., °C. | 255 | 254 | 260 | 260 |
| Extruder Pressure, psig (megaPascals) | 1400 (9.66) | 1400 (9.66) | 1500 (10.34) | 1400 (9.66) |
| Extruder Screw (rpm) | 40 | 40 | 50 | 50 |
| NIP Speed, ft/min (meters/min) | 46 (14.0) | 46 (14.0) | 43 (13.1) | 51 (15.5) |
| Film Thickness, mil (microns) | 0.49 (12.4) | 0.49 (12.4) | 0.59 (15.0) | 0.48 (12.2) |
| Area Weight, grams/sq ft [grams/(meter)$^2$] | 1.71 (18.4) | 1.60 (17.2) | 2.01 (21.6) | 1.27 (13.7) |
| Density (sp. gr.) | 1.301 | 1.302 | 1.208 | 1.120 |
| Yield Stress, $10^3$ psi (MD/TD)* (megaPascals or mPa) | 8.6/7.6 (59.3/52.4) | 7.8/5.9 (53.8/40.7) | 5.3/7.4 (36.5/51.0) | 5.1/6.4 (35.2/44.1) |

*(Machine Direction/Transverse Direction)

EXAMPLE 11
BLOWN FILM PROPERTIES

| Material or Blend | (80) Polyester A (20) CA-398-30 | (75) Polyester A (5) Polyester A (Yellow) (20) CA-398-30 | (75) Polyester A (5) Polyester A (Red) (20) CA-398-30 | (80) Polyester A (5) Polyester A (Blue) (20) CA-398-30 |
|---|---|---|---|---|
| Extruder Melt Temp., °C. | 255 | 255 | 256 | 257 |
| Extruder Pressure, psig (megaPascals) | 1400 (9.66) | 1400 (9.66) | 1400 (9.66) | 1400 (9.66) |
| Extruder Screw, rpm (meters/min) | 50 (15.5) | 50 (15.5) | 50 (15.5) | 50 (15.5) |
| NIP Speed (ft/min) | 51 | 51 | 51 | 51 |
| Film Thickness, mil (microns) | 0.60 (15.2) | 0.53 (13.5) | 0.49 (12.4) | 0.48 (12.2) |
| Area Weight, grams/sq ft [grams/(meter)$^2$] | 1.84 (19.8) | 1.57 (16.9) | 1.53 (16.5) | 1.44 (15.5) |
| Inherent Viscosity (dl/gm) | 0.629 | 0.650 | 0.660 | 0.657 |
| Density (sp. gr.) | 1.143 | 1.143 | 1.109 | 1.117 |
| Yield Stress, $10^3$ psi (MD/TD) (megaPascals) | 8.8/7.2 (60.7/49.6) | 9.1/8.2 (62.7/56.5) | 8.1/7.6 (55.8/52.4) | 8.0/7.6 (55.2/52.4) |
| Oxygen Transmission (cc-mil/100 in$^2$-24 hr-atm) | 11.5 | 12.2 | 11.7 | 11.8 |
| (liter)(micron) / (m$^2$)(24 hr)(atm) | (4.53) | (4.80) | (4.61) | (4.65) |

Polyester A is described as follows:
Reaction Product Of:
Dicarboxylic acid(s) or Ester Thereof: dimethyl terephthalate
Glycol(s): ethylene glycol
I.V.: 0.70

-continued

Tg: 80° C.
Tm: 255° C.

Polyester B is described as follows:
Reaction Product Of:
Dicarboxylic acid(s) or Ester Thereof: dimethyl terephthalate -continued

| | |
|---|---|
| Glycol(s) | ethylene glycol |
| I.V. | 0.64 |
| Tg | 80° C. |
| Tm | 255° C. |
| Polyester C is described as follows: | |
| Reaction Product Of: | |
| Dicarboxylic acid(s) or Ester Thereof | 99.5 mol % 1,4-cyclo-hexanedicarboxylic acid |
| | 0.5 mol % trimellatic anhydride |
| Glycol(s) | 91.1 mol % 1,4-cyclo-hexanedimethanol |
| | 8.9 mol % poly(tetra-methylene ether glycol) |
| I.V. | 1.05 |
| Tg | below 0° C. |
| Tm | 200° C. |
| Polyester D is described as follows: | |
| Reaction Product Of: | |
| Dicarboxylic acid(s) or Ester Thereof | Naphthalene dicarboxylic acid |
| Glycol(s) | ethylene glycol |
| I.V. | 0.80 |
| Tg | 125° C. |
| Tm | 265° C. |
| Polyester E is described as follows: | |
| Reaction Product Of: | |
| Dicarboxylic acid(s) or Ester Thereof | terephthalic acid |
| Glycol(s) | 69 mol % ethylene glycol |
| | 31 mol % 1,4-cyclo-hexanedimethanol |
| I.V. | 0.75 |
| Tg | 80° C. |
| Tm | amorphous |
| Polyester F is described as follows: | |
| Reaction Product Of: | |
| Dicarboxylic acid(s) or Ester Thereof | 75 mol % terephthalic acid |
| | 25 mol % trans-4,4'-stilbene dicarboxylic acid |
| Glycol(s) | ethylene glycol |
| I.V. | 0.8 |
| Tg | 95° C. |
| Tm | 215° C. |

The cellulose acetates, designated as "CA" are as defined in the table above.

Where ratios or parts are given, e.g., 80/20, they are parts by weight, with the polyester weight specified first.

The following applies to Kubelka-Munk values:
SX is the scattering coefficient of the whole thickness of the article and is determined as follows:

$$SX = \frac{1}{b} \text{ Ar ctgh} \frac{a-R}{b} - \text{Ar ctgh} \frac{a-Rg}{b}$$

wherein:
$b = (a^2 - 1)^{\frac{1}{2}}$

Ar ctgh is the inverse hyperbolic cotangent $$a = \frac{1}{2} R + \frac{Ro - R + Rg}{RoRg}$$

Ro is reflectance with black tile behind sheet
R is reflectance with white tile behind sheet
Rg is reflectance of a white tile = 0.89
KX is the absorption coefficient of the whole thickness of the article and is determined as follows:

$$KX = SX(a-1)$$

wherein SX and a are as defined above
R (infinity) is the reflectance of an article if the article was so thick that additional thickness would not change it and is determined as follows:

$$R(\text{infinity}) = a - (a^2 - 1)^{\frac{1}{2}}$$

wherein a is as defined above
Ti is the internal light transmittance and is determined as follows:

$$Ti = [(a - Ro)^2 - b^2]^{\frac{1}{2}}$$

Opacity = Ro/Rg
wherein Ro and Rg are as defined above.

In the above formulae, Ro, R and Rg are determined in a conventional manner using a Diano Match-Scan II Spectrophotometer (Milton Roy Co.) using a wavelength of 560 nanometers. Also above, X in the formulae SX and KX is the thickness of the article. A full description of these terms is found in "Business, Science and Industry" 3rd Edition, by Deane B. Judd & Gunter Wyszecki, published by John Wiley & Sons, N.Y. (1975), pages 397–439, which is incorporated herein by reference.

Glass transition temperatures, Tg, and melt temperatures, Tm, are determined using a Perkin-Elmer DSC-2 Differential Scanning Calorimeter.

In the examples, physical properties are measured as follows:

| | |
|---|---|
| Tensile Strength at Yield | ASTM D882 |
| Tensile Strength at Break | ASTM D882 |
| Elongation at Break | ASTM D882 |

Unless otherwise specified inherent viscosity is measured in a 60/40 parts by weight solution of phenol/tetrachloroethane 25° C. and at a concentration of 0.5 gram of polymer in 100 mL of the solvent.

Where acids are specified herein in the formation of the polyesters or copolyesters, it should be understood that ester forming derivatives of the acids may be used rather than the acids themselves as is conventional practice. For example, dimethyl isophthalate may be used rather than isophthalic acid.

In the examples, oxygen permeability is determined according to ASTM D 3985, in cubic centimeters permeating a 1 mil (25.4 μm) thick sample, 100 inches square (approx. 64,500 cm²), for a 24-hour period under oxygen partial pressure difference of one atmosphere at 30° C. using a MOCON Oxtran 10-50 instrument. Oxygen permeability is also given in S.I. (Systems International) units in cubic centimeters permeating a 1 cm. thick sample, 1 cm. square, for 1 second at atmospheric pressure.

Unless otherwise specified, all parts, ratios, percentages, etc. are by weight.

IMAGING UNITS

The imaging units of the photographic elements of this invention contain one or more radiation-sensitive silver halide emulsion layers. The silver halide emulsion layers can take any convenient conventional form.

In the simplest possible form the photographic elements contain a single silver halide emulsion layer. In the simplest possible form a silver halide emulsion can consist of radiation-sensitive silver halide grains and a vehicle. The silver halide grains can be chosen from among silver bromide, silver chloride, silver iodide, silver chlorobromide, silver chloroiodide, silver bromoiodide, silver chlorobromoiodide, or mixtures thereof. The vehicle can be comprised of a hydrophilic colloid peptizer, such as gelatin or a gelatin derivative.

Suitable imaging units containing one or more silver halide emulsion layers are illustrated by *Research Disclosure*, Vo. 176, Dec. 1978, Item 17643, the disclosure of which is here incorporated by reference. *Research Disclosure* is published by Kenneth Mason Publications, Ltd., Emsworth, Hampshire P010 7DD, England. The silver halide grain structures of silver halide emulsions are specifically disclosed by Section I of Item 17643. Vehicles for the emulsions are specifically illustrated by Section IX of Item 17643.

The following conventional photographic element features can be present in the imaging unit, again referring to sections of Item 17643:

Section III.
Chemical sensitizers;

Section IV.
Spectral sensitizers and desensitizers;

Section V.
Brighteners;

Section VI.
Antifoggants and stabilizers;

Section VII.
Color materials;

Section VIII.
Absorbing and scattering materials;

Section X.
Hardeners;

Section XI.
Coating Aids;

Section XII.
Plasticizers and Lubricants;

Section XVI.
Matting agents;

Section XX.
Developing agents;

Section XXI.
Development modifiers;

Section XXII.
Physical development systems;

Section XXIII.
Image transfer systems;

Section XXIV.
Dry development systems;

Section XXV.
Printing and lithography;

Section XXVI.
Printout; and

Section XXV.
Direct-print.

In addition to the varied forms of imaging units disclosed by Item 17643, cited above, the following are additionally specifically contemplated:

(a) Imaging units containing one or more radiation-sensitive tabular grain silver halide emulsion layers, illustrated by *Research Disclosure*, Vol. 225, Jan. 1983, Item 22534; Abbott et al U.S. Pat. No. 4,425,426; Daubendiek et al U.S. Pat. No. 4,672,027 and 4,693,964; Sowinski et al U.S. Pat. No. 4,656,122; Maskasky U.S. Pat. Nos. 4,173,320 and 4,173,323; and Reeves U.S. Pat. No. 4,435,499.

(b) Element constructions specifically adapted for radiography, illustrated by *Research Disclosure*, Vol 184, Aug. 1979, Item 18431.

(c) Reflection color print materials, illustrated by *Research Disclosure*, Vol. 176, Nov. 1979, Item 18716.

The imaging units can be exposed and processed by any convenient conventional technique. Such techniques are illustrated by the items of paragraphs (a), (b), and (c), cited above.

The invention has been described in detail with particular reference to preferred embodiments thereof, but it will be understood that variations and modifications can be effected within the spirit and scope of the invention.

What is claimed is:

1. A photographic element comprised of a reflective or diffusely transmissive support, and coated on said support,
   at least one radiation-sensitive silver halide emulsion layer,
   characterized in that said support is comprised of a continuous polyester phase having dispersed therein microbeads of cellulose acetate which are at least partially bordered by void space, said microbeads of cellulose acetate being present in an amount of 10–30% by weight based on the weight of said polyester, said void space occupying 2–50% by volume of said support, said polyester having an I.V. of at least 0.55 and said cellulose acetate having an acetyl content of about 28–44.8% by weight, a viscosity of about 0.02–90 seconds and the microbeads thereof having an average diameter of about 0.1–50 microns.

2. A photographic element according to claim 1 further characterized in that said support is comprised of a continuous polyester phase having dispersed therein microbeads of cellulose acetate which are at least partially bordered by void space, said microbeads of cellulose acetate being present in an amount of 10–30% by weight based on the weight of said polyester, said void space occupying 2–50% by volume of said support, said polyester having an I.V. of at least 0.55 and said cellulose acetate having an acetyl content of about 28–44.8% by weight, a viscosity of about 0.02–90 seconds and the microbeads thereof having an average diameter of about 0.1–50 microns, the composition of said support when consisting only of said polyester continuous phase and said microbeads at least partially bordered by void space characterized by having a Kubelka-Munk R value (infinite thickness) of 0.90 to 1.0 and the following Kubelka-Munk values when formed into a 3 mil (76.2 micron) thick film:

| | |
|---|---|
| Opacity | 0.78 to 1.0 |
| SX | 25 or less |
| KX | 0.001 to 0.2 |
| T(i) | 0.02 to 1.0 |

3. A photographic element according to claim 2 further characterized in that said polyester is poly(ethylene terephthalate) having an I.V. of at least 0.55.

4. A photographic element according to claim 2 further characterized in that said void spaces completely encircle said microbeads.

5. A photographic element according to claim 2 further characterized in that said void spaces surround said microbeads, said void spaces being oriented such that they lie in generally the same or parallel planes.

6. A photographic element according to claim 2 further characterized in that said support is a sheet of 0.10–20 mils (2.54–508 microns) thickness.

7. A photographic element according to claim 1 further characterized in that said support is a paper-like sheet having a continuous phase of poly(ethylene terephthalate) having dispersed therein microbeads of cellulose acetate encircled by void space when viewed in a direction perpendicular to the plane of the sheet,
 (a) said poly(ethylene terephthalate) having a Tg of 60°–100° C. and an I.V. of at least 0.55,
 (b) said cellulose acetate having an acetyl content of about 28 to 44.8% by weight, a viscosity of about 0.01–90 seconds, and a Tg of at least 20° C. higher than the Tg of said poly(ethylene terephthalate),
 (c) said microbeads having an average diameter of about 0.1–50 microns and being present in an amount of about 10–30% by weight based on the weight of said poly(ethylene terephthalate),
 (d) said void space occupying about 2–50% by volume of said sheet, and
 (e) said sheet when consisting only of said polyester continuous phase and said microbeads at least partially bordered by void space characterized by having a Kubelka-Munk R value (infinite thickness) of about 0.90 to about 1.0 and the following Kubelka-Munk values when formed into a 3 mil (76.2 microns) thick film:

| | |
|---|---|
| Opacity | about 0.78 to about 1.0 |
| SX | 25 or less |
| KX | about 0.001 to 0.2 |
| T(i) | about 0.02 to 1.0 |

8. A photographic element comprised of
a reflective or diffusely transmissive support and, coated on said support,
at least one radiation-sensitive silver halide emulsion layer,
characterized in that said support is comprised of a continuous polyester phase having dispersed therein microbeads of cellulose acetate which are at least partially bordered by void space, said microbeads of cellulose acetate being present in an amount of 10–30% by weight based on the weight of said polyester, said void space occupying 2–50% by volume of said support, said polyester having an I.V. of at least 0.55 and said cellulose acetate having an acetyl content of about 28 to 44.8% by weight, a viscosity of about 0.01 to 90 seconds, and the microbeads thereof having an average diameter of about 0.1 to 50 microns.

* * * * *